(12) United States Patent
Mohammadi

(10) Patent No.: US 12,371,574 B2
(45) Date of Patent: Jul. 29, 2025

(54) FLAME RESISTANT COMPOSITIONS FOR ADDITIVE MANUFACTURING AND ASSOCIATED PRINTED 3D ARTICLES COMPRISING INTUMESCENT ADDITIVES

(71) Applicant: 3D Systems, Inc., Rock Hill, SC (US)

(72) Inventor: Meisam Shir Mohammadi, Rock Hill, SC (US)

(73) Assignee: 3D Systems, Inc., Rock Hill, SC (US)

( * ) Notice: Subject to any disclaimer, the term of this patent is extended or adjusted under 35 U.S.C. 154(b) by 168 days.

(21) Appl. No.: 18/448,400

(22) Filed: Aug. 11, 2023

(65) Prior Publication Data

US 2024/0059910 A1   Feb. 22, 2024

Related U.S. Application Data

(60) Provisional application No. 63/443,176, filed on Feb. 3, 2023, provisional application No. 63/397,587, filed on Aug. 12, 2022.

(51) Int. Cl.

| | |
|---|---|
| *C09D 5/18* | (2006.01) |
| *B33Y 70/00* | (2020.01) |
| *C09D 5/03* | (2006.01) |
| *C09D 7/40* | (2018.01) |
| *C09D 7/61* | (2018.01) |
| *C09D 7/63* | (2018.01) |
| *C09D 177/02* | (2006.01) |
| *C09D 177/04* | (2006.01) |
| *C09K 21/02* | (2006.01) |
| *C09K 21/12* | (2006.01) |
| *B29C 64/153* | (2017.01) |
| *B29K 77/00* | (2006.01) |
| *B29K 105/00* | (2006.01) |
| *B33Y 10/00* | (2015.01) |
| *C08K 5/5313* | (2006.01) |
| *C08K 7/24* | (2006.01) |

(52) U.S. Cl.
CPC .............. *C09D 5/185* (2013.01); *B33Y 70/00* (2014.12); *C09D 5/031* (2013.01); *C09D 5/033* (2013.01); *C09D 7/61* (2018.01); *C09D 7/63* (2018.01); *C09D 7/69* (2018.01); *C09D 177/02* (2013.01); *C09D 177/04* (2013.01); *C09K 21/02* (2013.01); *C09K 21/12* (2013.01); *B29C 64/153* (2017.08); *B29K 2077/00* (2013.01); *B29K 2105/251* (2013.01); *B33Y 10/00* (2014.12); *C08K 5/5313* (2013.01); *C08K 7/24* (2013.01); *C08K 2201/005* (2013.01)

(58) Field of Classification Search
CPC ......... B33Y 70/00; C09D 5/031; C09D 5/185
See application file for complete search history.

(56) References Cited

U.S. PATENT DOCUMENTS

| | | |
|---|---|---|
| 11,008,458 B2 | 5/2021 | Jogikalmath et al. |
| 2022/0185928 A1 | 6/2022 | Moussa |
| 2022/0289942 A1 | 9/2022 | Moussa |
| 2022/0289984 A1 | 9/2022 | Moussa |

FOREIGN PATENT DOCUMENTS

| | | |
|---|---|---|
| CN | 112322029 A | 2/2021 |
| WO | 2020043886 A1 | 3/2020 |
| WO | 2021043929 A1 | 11/2021 |
| WO | 2022106402 A1 | 5/2022 |

OTHER PUBLICATIONS

Lu et al., "Preparation and flame-retardant mechanism of polyheptazine/PA6 nanocmposites", Polymer, 182, 2019, 121810, doi: https://doi.org/10.1016/j.polymer.2019.121810.

Niu et al., "Graphene-Like Carbon Nitride Nanosheets for Improved Photocatalytic Activities", Advanced Functional Materials, 22(22), 2012, 4763-4770, doi: https://doi.org/10.1002/adfm.201200922.

PCT International Search Report for International Search Authority for PCT/US2023/072061 mailed Dec. 4, 2023 (6 pages).

PCT International Written Opinion for International Search Authority for PCT/US2023/072061 mailed Dec. 4, 2023 (6 pages).

Database Caplus [Online] Chemical Abstract Service, Columbus, Ohio, US; Feb. 5, 2021 (Feb. 5, 2021), Lei Weijian et al: "Halogen-free flame-retardant nylon material for 3D printing and preparation method thereof", XP093103382, retrieved from STN, Database accession No. 2021:297702 abstract—& CN 112 322 029 A (Guangdong Jushi Tech Research Co Ltd) Feb. 5, 2021 (Feb. 5, 2021) abstract; claims 1, 5, 6.

*Primary Examiner* — James Sanders
(74) *Attorney, Agent, or Firm* — Maynard Nexsen PC; John P. Zimmer

(57) ABSTRACT

Compositions for additive manufacturing applications are described herein which, in some embodiments, impart flame resistant and/or flame retardant properties to articles printed or formed from the compositions. The compositions may also impart desirable mechanical properties to the articles. In some embodiments, a composition comprises a sinterable powder or a thermoplastic polymer in an amount of 10-99 wt. %, based on the total weight of the composition, and an intumescent additive in an amount of up to 30 wt. %, based on the total weight of the composition. The intumescent additive comprises a phosphinate component and at least one of (a) a heptazine or melamine-derived component, and (b) a proton donor component.

19 Claims, No Drawings

FLAME RESISTANT COMPOSITIONS FOR ADDITIVE MANUFACTURING AND ASSOCIATED PRINTED 3D ARTICLES COMPRISING INTUMESCENT ADDITIVES

CROSS REFERENCE TO RELATED APPLICATIONS

This application claims priority pursuant to 35 U.S.C. § 119 to U.S. Provisional Patent Application No. 63/397,587, filed Aug. 12, 2022, and to U.S. Provisional Patent Application No. 63/443,176, filed Feb. 3, 2023, each of which is hereby incorporated by reference in its entirety.

FIELD

The present invention relates to compositions for additive manufacturing and, in particular, to compositions imparting flame resistant or flame retardant properties to articles printed or formed from the compositions.

BACKGROUND

Three-dimensional (3D) printers and systems employ materials of various kinds to form various 3D objects, articles, or parts in accordance with computer generated files. Such materials can include build materials used to form the objects themselves, as compared to sacrificial support materials which may be used to support an object during the additive manufacturing process but which are subsequently removed from the final printed object. Some build materials are also known as inks, for example in the case of polymerizable liquids or other fluids that are jetted or otherwise selectively deposited to form a 3D object. In some such instances, the build material is solid at ambient temperatures and converts to liquid at elevated jetting temperatures. In other instances, the build material is liquid at ambient temperatures. Build materials can also be powders or dry particulate materials, as opposed to polymerizable liquids. Such powders may be used in selective laser sintering (SLS) and similar additive manufacturing techniques.

Build materials can comprise a variety of chemical species. Chemical species to include in a build material can be selected according to various considerations including, but not limited to, desired chemical and/or mechanical properties of the printed article and operating parameters of the 3D printing apparatus or system. Unfortunately, some build materials and resultant articles printed from the build materials can be unsuitable for electronics and transportation applications and/or other applications necessitating flame resistance. As a result, 3D printing technology may find limited application in fields requiring flame resistant or flame retardant materials and articles, and there is a need for improved materials for forming flame resistant or flame retardant articles by additive manufacturing.

SUMMARY

In view of the foregoing, compositions (or build materials) for additive manufacturing applications are described herein which, in some embodiments, impart flame resistant and/or flame retardant properties to articles printed or formed from the compositions. The compositions may also impart or preserve desirable mechanical properties to the articles. In some embodiments, a composition described herein comprises a sinterable powder in an amount of 10-99 wt. %, based on the total weight of the composition, and an intumescent additive in an amount of up to 30 wt. %, based on the total weight of the composition. The intumescent additive comprises a phosphinate component and at least one of (a) a heptazine or melamine-derived component and (b) a proton donor component differing from the phosphinate component (and/or the heptazine or melamine-derived component). In some cases, the intumescent additive (in addition to the phosphinate component) comprises only the heptazine or melamine-derived component. In some such cases, the phosphinate component can be a proton donor, and the heptazine or melamine-derived component can be an electron donor or carbon donor. In other instances, the intumescent additive comprises both the heptazine or melamine-derived component and also the additional proton donor component.

In some embodiments of a composition described herein, the phosphinate component comprises a species of Formula I or Formula II:

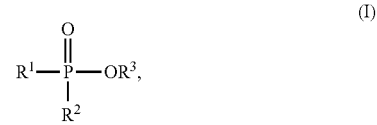

wherein $R^1$, $R^2$, and $R^3$ are each independently selected from the group consisting of hydrogen, alkyl, alkenyl, alkynyl, cycloalkyl, heteroalkyl, heteroalkenyl, heterocyclyl, aryl, and heteroaryl; and

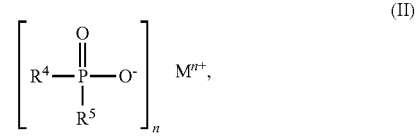

wherein $R^4$ and $R^5$ are each independently selected from the group consisting of hydrogen, alkyl, alkenyl, alkynyl, cycloalkyl, heteroalkyl, heteroalkenyl, heterocyclyl, aryl, and heteroaryl; M is a metal; and n is an integer ranging from 1 to 3.

Additionally, in some cases, the heptazine or melamine-derived component comprises a heptazine derivative or heptazine-based species such as melem, melam, or melon. Other species may also be used, as described further below. In some cases, the heptazine or melamine-derived component does not comprise melamine itself.

The additional proton donor component of a composition described herein, in some embodiments, comprises an organophosphorus compound other than a phosphinate.

In some embodiments of a composition described herein, the intumescent additive comprises additional components differing from the phosphinate component, the heptazine or melamine-derived component, and the additional proton donor component. In some instances, the intumescent additive component may comprise a blowing agent, as described further herein below.

The sinterable powder of a composition described herein, in some cases, comprises a semicrystalline polymer, including as a primary or majority component in some instances. For example, in some embodiments, the sinterable powder comprises a polyamide (PA), a polyester (PEs), a polyurethane (PU), a polyethyelene (PE), a polypropylene (PP), a poly(butylene terephthalate) (PBT), a poly(etheretherketone) (PEEK), a poly(etherketoneketone) (PEKK), or a combination of two or more of the foregoing. A sinterable powder described herein, in some embodiments, further comprises a filler component or filler material, such as glass, ceramic, or carbon fiber.

Moreover, in some cases, a composition described herein is free or substantially free of phosphate.

Some compositions described herein are particularly suited for forming 3D articles using SLS and other additive manufacturing techniques employing a powder or dry particulate build material. However, compositions and methods described herein are not necessarily limited to SLS or other sintering applications or uses. The present disclosure also contemplates compositions and methods of forming articles using other additive manufacturing techniques. For example, in some instances, compositions and methods for fused deposition modeling (FDM) are also described. In such embodiments, the sinterable powder described above can be replaced with a different material, such as a thermoplastic polymer that can be extruded, jetted, or otherwise deposited in a layer-by-layer manner to form a 3D article.

Therefore, in some cases, a composition for additive manufacturing is described herein, wherein the composition comprises a thermoplastic polymer in an amount of 10-99 wt. %, based on the total weight of the composition, and an intumescent additive in an amount of up to 30 wt. %, based on the total weight of the composition. The intumescent additive can comprise a phosphinate component and at least one of (a) a heptazine or melamine-derived component, and (b) a proton donor component differing from the phosphinate component. In some preferred embodiments, the intumescent additive comprises the phosphinate component (which can be a proton donor) and the heptazine or melamine-derived component (which can be an electron donor or a carbon donor), but does not necessarily include an additional proton donor component that differs from the phosphinate component or the heptazine or melamine-derived component. Moreover, the intumescent additive can comprise any of the components, species, or combinations of combinations and species described above for compositions that include a sinterable powder instead of a non-particulate or non-powder thermoplastic polymer. For example, in some embodiments, the intumescent additive can comprise additional components. A blowing agent may also be included in the intumescent additive. The thermoplastic polymer, in some embodiments, comprises an acrylonitrile butadiene styrene (ABS), a polylactic acid (PLA), a polyethylene terephthalate (PET), a thermoplastic polyurethane (TPU), a nylon, a polycarbonate, or a combination, block copolymer, or melt of two or more of the foregoing.

Methods of printing or forming a 3D article are also described herein. In some embodiments, such a method comprises providing a composition described herein and selectively solidifying layers of the composition to form the article. In some cases, the composition is provided in a layer-by-layer process. Moreover, in some instances, a composition and method described herein provide a printed article having flame resistant and/or fire retardant properties. For example, in some embodiments, an article formed from a composition and/or method described herein has a v0 or v1 rating according to UL 94 V.

In addition, an article formed from a composition and/or method described herein can provide flame resistance and/or fire retardation while also maintaining other desired mechanical properties. For example, in some instances, the article has a tensile modulus that is at least 90% of a tensile modulus of a reference article formed from a reference composition omitting the intumescent component. Additionally, in some embodiments, the article has tensile strength that is at least 70% of tensile strength of a reference article formed from a reference composition omitting the intumescent component. Further, in some embodiments, the article has an elongation at break that is at least 70% of an elongation at break of a reference article formed from a reference composition omitting the intumescent component.

These and other embodiments are further described in the following detailed description.

DETAILED DESCRIPTION

Embodiments described herein can be understood more readily by reference to the following detailed description and examples. Elements, apparatus and methods described herein, however, are not limited to the specific embodiments presented in the detailed description and examples. It should be recognized that these embodiments are merely illustrative of the principles of the present invention. Numerous modifications and adaptations will be readily apparent to those of skill in the art without departing from the spirit and scope of the invention.

In addition, all ranges disclosed herein are to be understood to encompass any and all subranges subsumed therein. For example, a stated range of "1.0 to 10.0" should be considered to include any and all subranges beginning with a minimum value of 1.0 or more and ending with a maximum value of 10.0 or less, e.g., 1.0 to 5.3, or 4.7 to 10.0, or 3.6 to 7.9.

All ranges disclosed herein are also to be considered to include the end points of the range, unless expressly stated otherwise. For example, a range of "between 5 and 10" should generally be considered to include the end points 5 and 10.

Further, when the phrase "up to" is used in connection with an amount or quantity, it is to be understood that the amount is at least a detectable amount or quantity. For example, a material present in an amount "up to" a specified amount can be present from a detectable amount and up to and including the specified amount.

Additionally, in any disclosed embodiment, the terms "substantially," "approximately," and "about" may be substituted with "within [a percentage] of" what is specified, where the percentage could be 0.1, 1, 5, or 10 percent, unless the use of such a term in a given instance indicates otherwise.

It is also to be understood that the article "a" or "an" refers to "at least one," unless the context of a particular use requires otherwise.

The terms "three-dimensional printing system," "three-dimensional printer," "printing," and the like generally describe various solid freeform fabrication techniques for making three-dimensional articles or objects by selective laser sintering (SLS), stereolithography (SLA), dynamic light projection (DLP), selective deposition, jetting, fused deposition modeling (FDM), multijet modeling (MJM), and other additive manufacturing techniques now known in the art or that may be known in the future that use a build material or ink to fabricate three-dimensional objects.

Further definitions include the following:

The term "alkyl" as used herein, alone or in combination, refers to a straight or branched saturated hydrocarbon group optionally substituted with one or more substituents. For example, an alkyl can be $C_1$ to $C_{30}$, or $C_1$ to $C_{18}$.

The term "alkenyl" as used herein, alone or in combination, refers to a straight or branched chain hydrocarbon group having at least one carbon-carbon double bond and optionally substituted with one or more substituents.

The term "alkynyl" as used herein, alone or in combination, refers to a straight or branched chain hydrocarbon group having at least one carbon-carbon triple bond and optionally substituted with one or more substituents.

The term "aryl" as used herein, alone or in combination, refers to an aromatic monocyclic or multicyclic ring system optionally substituted with one or more ring substituents.

The term "heteroaryl" as used herein, alone or in combination, refers to an aromatic monocyclic or multicyclic ring system in which one or more of the ring atoms is an element other than carbon, such as nitrogen, boron, oxygen and/or sulfur.

The term "heterocycle" as used herein, alone or in combination, refers to a mono- or multicyclic ring system in which one or more atoms of the ring system is an element other than carbon, such as boron, nitrogen, oxygen, and/or sulfur or phosphorus and wherein the ring system is optionally substituted with one or more ring substituents. The heterocyclic ring system may include aromatic and/or non-aromatic rings, including rings with one or more points of unsaturation.

The term "heteroalkyl" as used herein, alone or in combination, refers to an alkyl moiety as defined above, having one or more carbon atoms, for example one, two or three carbon atoms, replaced with one or more heteroatoms, which may be the same or different.

The term "heteroalkenyl" as used herein, alone or in combination, refers to an alkyl moiety as defined above, having one or more carbon atoms, for example one, two or three carbon atoms, replaced with one or more heteroatoms, which may be the same or different.

The term "cycloalkyl" as used herein, alone or in combination, refers to a non-aromatic, mono- or multicyclic ring system optionally substituted with one or more ring substituents.

In one aspect, compositions for use in additive manufacturing applications are described herein. The compositions, for example, can be employed in SLS and FDM printing applications.

A composition described herein, in some embodiments, comprises a sinterable powder in an amount of 10-99 wt. %, based on the total weight of the composition, and an intumescent additive in an amount of up to 30 wt. %, based on the total weight of the composition. The intumescent additive comprises a phosphinate component and at least one of (a) a heptazine or melamine-derived component and (b) a proton donor component differing from the phosphinate component. In some cases, the intumescent additive comprises only the heptazine or melamine-derived component and does not comprise the additional proton donor component. In other instances, the intumescent additive comprises both the heptazine or melamine-derived component and also the additional proton donor component.

As described further herein, compositions according to the present disclosure can provide flame resistance and/or fire retardation while also maintaining other desired mechanical properties. More particularly, in some cases, compositions described herein can provide or impart intumescent properties to articles formed from the compositions. Fire generally requires three components to start: fuel, oxygen, and flame or ignition. Flame or fire retardant or resistant solutions, such as those described herein, can remove or inhibit one or more of the foregoing components of the so-called "fire triangle." In some embodiments, a composition or printed 3D article described herein is intumescent. Such an intumescent composition or article can create a physical barrier (such as a char or non-flammable material) between a flame or fire and the flame's or fire's fuel (e.g., where the "fuel" would be a portion or all of the composition or article itself, which might otherwise burn or burn more quickly, were it not for the physical barrier provided by the intumescent composition).

Turning now to specific components, the phosphinate component of the intumescent additive can comprise any phosphinate not inconsistent with the technical objectives described herein. In some embodiments, the phosphinate component comprises one or a mixture of specific phosphinate chemical species, including a mixture of particular chemical species described hereinbelow.

In some embodiments, the phosphinate component comprises a species of Formula I or Formula II:

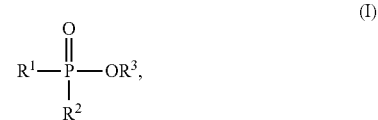

(I)

wherein $R^1$, $R^2$, and $R^3$ are each independently selected from the group consisting of hydrogen, alkyl, alkenyl, alkynyl, cycloalkyl, heteroalkyl, heteroalkenyl, heterocyclyl, aryl, and heteroaryl; and

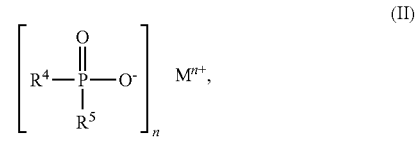

(II)

wherein $R^4$ and $R^5$ are each independently selected from the group consisting of hydrogen, alkyl, alkenyl, alkynyl, cycloalkyl, heteroalkyl, heteroalkenyl, heterocyclyl, aryl, and heteroaryl;

M is a metal; and n is an integer ranging from 1 to 3.

As understood by one of ordinary skill in the art, a species of Formula II can be a metal salt of a species of Formula I. For example, in some cases, $M^{n+}$ is $Na^+$, $Zn^{2+}$ or $Al^{3+}$. It is also possible to replace the counter ion $M^{n+}$ with a different cation that does not necessarily comprise or consist of a metal ion, such as an organic cation or a complex cation.

A phosphinate component (or the total amount of the phosphinate component) of an intumescent additive described herein can be present in any amount not inconsistent with the technical objectives of the present disclosure. In some cases, for example, the phosphinate component is present in an amount of up to 25 wt. %, up to 20 wt. %, up to 15 wt. %, up to 10 wt. %, or up to 5 wt. %, based on the total weight the composition. In some instances, the phosphinate component is present in an amount of 1-25 wt. %, 1-20 wt. %, 1-15 wt. %, 1-10 wt. %, 1-5 wt. %, 5-25 wt. %, 5-20 wt. %, 5-15 wt. %, 10-25 wt. %, 10-20 wt. %, or 15-25 wt. %, based on the total weight of the composition.

The intumescent additive of a composition described herein can also comprise a heptazine or melamine-derived component. Any heptazine or melamine-derived component not inconsistent with the technical objectives of the present disclosure may be used. In some instances, the heptazine or melamine-derived component is a derivative of or contains one or more structural units corresponding to heptazine or melamine. In some embodiments, for example, the heptazine or melamine-derived component comprises melem, melam, or melon. In some cases, the heptazine or melamine-derived component does not comprise melamine itself.

In some cases, the heptazine or melamine-derived component comprises a species of Formula III:

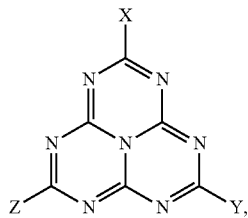

(III)

wherein X, Y, and Z are each independently selected from H and $NR^6R^7$; and
wherein $R^6$ and $R^7$ are each independently selected from H and a C1-C5 alkyl. For example, in some embodiments, X, Y, and Z are each H. In other cases, X, Y, and Z are each $NH_2$.

It is further to be understood that a "Cn" (or "$C_n$") species described herein (such as a "Cn" alkyl) is a species (such as an alkyl moiety) that comprises or includes exactly "n" carbon atoms. Thus, C1-C5 alkyl groups can respectively comprise any alkyl group having exactly 1, 2, 3, 4, or 5 carbons.

In some embodiments described herein, $R^6$ and $R^7$ are each H, such that one or more of X, Y, and Z comprise $NH_2$. In some cases, $R^6$ and $R^7$ are each independently H, methyl, or ethyl.

In other embodiments, the heptazine or melamine-derived component comprises a species of Formula IV:

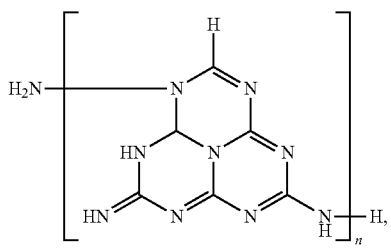

(IV)

wherein n is an integer from 2 to 1000.

In some embodiments, the heptazine or melamine-derived component comprises a species of Formula V:

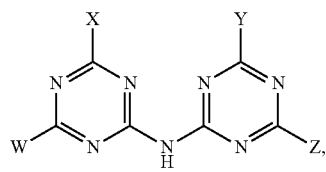

(V)

wherein W, X, Y, and Z are each independently selected from H and $NR^6R^7$; and wherein $R^6$ and $R^7$ are each independently selected from H and a C1-C5 alkyl. For example, in some cases, W, X, Y, and Z are each $NH_2$.

In some embodiments, the heptazine or melamine-derived component of an intumescent additive described herein comprises a heptazine or melamine-derived oligomer. As known to the skilled artisan, an oligomer comprises a plurality of chemically linked monomers. Thus, a heptazine or melamine-derived oligomer comprises a plurality of chemically linked heptazine or melamine-derived units. In some cases, the heptazine or melamine-derived oligomer comprises highly condensed $g-C_3N_4$. In embodiments cases, the heptazine or melamine-derived component comprises a species of Formula VI:

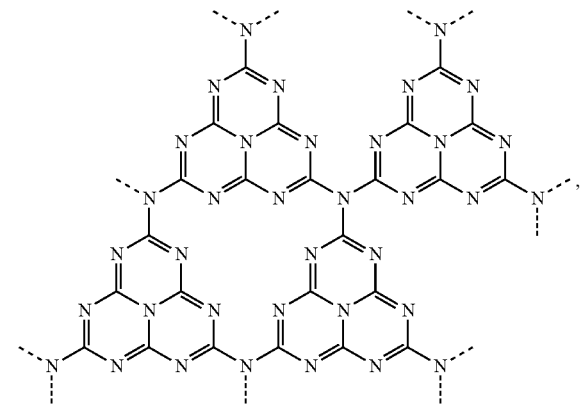

(VI)

wherein the dashed bonds indicate crosslinks between repeating units. Heptazine or melamine-derived oligomers such as highly condensed $g-C_3N_4$ can be made according to methods such as that found in Ping, N.; Zhang, L.; Gang, L.; Cheng; H. I., Graphene-Like Carbon Nitride Nanosheets for Improved Photocatalytic Activities, *Adv. Funct. Mater.* 2012 (22), 4763-4770. Other heptazine or melamine-derived oligomers may also be used in a composition described herein.

A heptazine or melamine-derived component (or the total amount of the heptazine or melamine-derived component) of an intumescent additive described herein can be present in any amount not inconsistent with the technical objectives of the present disclosure. In some cases, for example, the heptazine or melamine-derived component is present in an amount of up to 25 wt. %, up to 20 wt. %, up to 15 wt. %, up to 10 wt. %, or up to 5 wt. %, based on the total weight the composition. In some instances, the heptazine or melamine-derived component is present in an amount of 1-25 wt. %, 1-20 wt. %, 1-15 wt. %, 1-10 wt. %, 1-5 wt. %, 5-25 wt. %, 5-20 wt. %, 5-15 wt. %, 10-25 wt. %, 10-20 wt. %, or 15-25 wt. %, based on the total weight of the composition.

The intumescent additive of a composition described herein, in some embodiments, comprises a proton donor component. Such a proton donor component can provide an acidic proton to dehydrate or otherwise chemically modify another component of the intumescent additive, such as the phosphinate component. Dehydration or other chemical modification of the phosphinate component or other component of the intumescent additive can permit or accelerate the formation of a char or other physical barrier.

In some embodiments, the proton donor component of a composition described herein (that differs from the phosphinate component and/or the heptazine or melamine-derived component) comprises an organophosphorus compound other than a phosphinate. For example, in some cases, the proton donor component comprises a phosphonate or phosphonate-containing species, such as a bisphosphonate or a species comprising one or more phosphonate moieties. In some instances, the proton donor component comprises a species of Formula VII or Formula VIII:

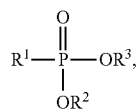

(VII)

wherein $R^1$, $R^2$, and $R^3$ are each independently selected from the group consisting of hydrogen, alkyl, alkenyl, alkynyl, cycloalkyl, heteroalkyl, heteroalkenyl, heterocyclyl, aryl, and heteroaryl; and

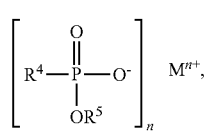

(VIII)

wherein $R^4$ and $R^5$ are each independently selected from the group consisting of hydrogen, alkyl, alkenyl, alkynyl, cycloalkyl, heteroalkyl, heteroalkenyl, heterocyclyl, aryl, and heteroaryl;

M is a metal; and n is an integer ranging from 1 to 3.

A proton donor component (or the total amount of the additional proton donor component) of an intumescent additive described herein can be present in any amount not inconsistent with the technical objectives of the present disclosure. In some cases, for example, the proton donor component is present in an amount of up to 25 wt. %, up to 20 wt. %, up to 15 wt. %, up to 10 wt. %, or up to 5 wt. %, based on the total weight the composition. In some instances, the proton donor component is present in an amount of 1-25 wt. %, 1-20 wt. %, 1-15 wt. %, 1-10 wt. %, 1-5 wt. %, 5-25 wt. %, 5-20 wt. %, 5-15 wt. %, 10-25 wt. %, 10-20 wt. %, or 15-25 wt. %, based on the total weight of the composition.

An intumescent additive of a composition described herein can also comprise one or more additional components. In some cases, an intumescent additive described herein further comprises a blowing agent component. Any blowing agent component not inconsistent with the technical objectives of the present disclosure may be used. For example, in some cases, the blowing agent component comprises urea, a urea-formaldehyde resin, or dicyandiamide.

A blowing agent component of an intumescent additive described herein can be present in any amount not inconsistent with the technical objectives of the present disclosure. In some cases, for example, the blowing agent component is present in an amount of up to 5 wt. %, up to 3 wt. %, up to 1 wt. %, up to 0.5 wt. %, or up to 0.1 wt. %, based on the total weight the composition. In some instances, the blowing agent component is present in an amount of 0.1-5 wt. %, 0.1-3 wt. %, 0.1-1 wt. %, 0.5-5 wt. %, 0.5-3 wt. %, or 0.5-1 wt. %, based on the total weight of the composition. In some embodiments, an intumescent additive of a composition described herein does not comprise a blowing agent component, or comprises less than 0.1 wt. % blowing agent component.

The intumescent additive of a composition described herein can be present in the composition in any amount consistent with the technical objectives of the present disclosure. In some embodiments, the intumescent additive is present in the composition in an amount of 10-30 wt. %, based on the total weight of the composition. In some cases, the intumescent additive is present in the composition in an amount of 14-24 wt. %, based on the total weight of the composition.

Compositions described herein, in some embodiments, also comprise a sinterable powder. As understood by a person of ordinary skill in the art, a "sinterable" powder can be selectively sintered or fused by application of energy, such as provided by a laser beam or other source of electromagnetic radiation. The application of energy (e.g., a selectively applied laser beam) can selectively heat powder particles, with the result that the powder partially melts and adjacent particles fuse with one another. "Sintering" can thus in some cases include the heating of the powder to a temperature which causes viscous flow only at contiguous boundaries of the individual powder particles, with at least some portion of substantially all particles remaining solid. As described above, such sintering can cause coalescence of particles into a sintered solid mass, the bulk density of which is increased compared to the bulk density of the powder particles before they were sintered. Such fusing can provide a solidified portion (e.g., a cross-section or layer) of an article or object being printed or formed by the process. An article or object formed by layer-by-layer or "slice-wise" joining of vertically contiguous layers which are sintered into stacked "layers" or "slices" can thus be described as autogenously densified. Such slices or layers can have a thickness of, for example, up to about 250 μm, such as in the range of 50 μm to 180 μm.

A sinterable powder of the present disclosure can thus have optical properties, thermal properties, and other properties suitable for use with a 3D printing system or method that forms objects by fusing or sintering individual powder particles together in a selective way. For instance, a sinterable powder can have optical (e.g., absorbance) and/or thermal properties (e.g., glass transition temperature, Tg; melting point, MP; or crystallization temperature Tc) selected for sintering with a particular source of electromagnetic radiation. In some embodiments, a sinterable powder described herein has a non-zero absorbance or an absorbance peak at the wavelength used in the 3D printing process (e.g., at the peak wavelength of the laser, such as a $CO_2$ laser, used in an SLS process). Moreover, in some cases, a sinterable powder described herein has a sintering window (defined as the metastable thermodynamic region between melting and crystallization, or the difference between the MP onset and Tc onset) of at least 10° C., such as a sintering window of 10-30° C., 10-25° C., or 10-20° C., when measured by differential scanning calorimetry (DSC) using a heating rate of 10° C./min. Additionally, in some instances, a sinterable powder described herein has an MP of 120-270° C., 150-250° C., 150-200° C., 150-180° C., 170-250° C., 170-220° C., 170-200° C., 190-250° C., 190-220° C., or 200-250° C.

Additionally, in some cases, a sinterable powder can have an average particle size and a flowability suitable for use in such an additive manufacturing method. For example, in some embodiments, a sinterable powder described herein has an average particle size ($D_{50}$) of 60-300 μm, 60-250 μm, 60-200 µm, 60-150 µm, 60-100 µm, 80-300 µm, 80-250 µm, 80-200 µm, 80-150 µm, 80-100 µm, 100-300 µm, 100-250 µm, 100-200 µm, 150-300 µm, 150-250 µm, 150-200 µm, 200-300 µm, or 200-250 µm. Particle sizes described herein can be measured using any suitable method known to one of ordinary skill in the art. For example, in some preferred embodiments, particle size is determined using sieve analysis, including in accordance with ASTM D1921. Further, a sinterable powder described herein, in some implementations, has a monomodal particle size distribution (PSD), as opposed to a bimodal or other higher order PSD.

Moreover, in some cases, a sinterable powder described herein has a normalized packing density of 20-45% or 25-40%. Further, in some embodiments, a sinterable powder described herein has an average roundness (defined as the ratio between the measured area of a particle and the area of an equivalent circle with the maximum length of the particle as diameter) of 0.4 to 0.6. Average roundness can be measured in any manner not inconsistent with the technical objectives of the present disclosure. In some cases, for example, average roundness is measured using dynamic image analysis in accordance with ISO 13322-2:2021.

Moreover, in some embodiments, a sinterable powder described herein has a bulk density and/or a tap (or tapped or tamped) density above 0.35 g/mL or above 0.4 g/mL, such as a bulk and/or tap (or tapped or tamped) density between 0.35 and 1 g/mL or between 0.4 and 1 g/mL, when measured in accordance with ASTM D1895B (bulk density) or ASTM B527 (tap density).

It is further to be noted that, in some cases, an intumescent additive described herein does not significantly alter the sintering window of a sinterable powder described herein. For example, in some cases, the sintering window of a composition including an intumescent additive described herein has a width (in degrees Celsius) and/or one or more end points (in degrees Celsius) that is within 1° C., within 2° C., or within 5° C. of an otherwise similar composition that does not include the intumescent additive. Moreover, in some instances, a composition described herein that comprises the intumescent additive does not smoke or generate smoke when heated by a laser or other source of heat in an additive manufacturing process, such as described herein. Thus, in some embodiments, carrying out a method described herein does not generate smoke observable to a human observer having average visual acuity when observing the method without any instruments or visual aids other than corrective lenses such as glasses or contact lenses.

Any sinterable powder not inconsistent with the objectives of the present disclosure may be used. In some cases, the sinterable powder comprises a semicrystalline polymer, including in some instances as a primary or majority component (by mass or weight) of the sinterable powder. Any semicrystalline polymer not inconsistent with the objectives of the present disclosure may be used. In some implementations, the sinterable powder of a composition described herein comprises (or primarily comprises as the majority component) a polyamide (PA), a polyester (PEs), a polyurethane (PU), a polyethyelene (PE), a polypropylene (PP), a poly(butylene terephthalate) (PBT), a poly(etheretherketone) (PEEK), a poly(etherketoneketone) (PEKK), or a combination of two or more of the foregoing. When the sinterable powder comprises a polyamide (PA), any PA not inconsistent with the objectives of the present disclosure may be used. For example, in some cases, the PA comprises polyamide-11 (PA 11), polyamide-12 (PA 12), or a combination of PA 11 and PA 12.

In some cases, a sinterable powder described herein comprises up to 100 wt. %, up to 99 wt. %, up to 95 wt. %, or up to 90 wt. % semicrystalline polymer, based on the total weight of the sinterable powder (not based on the total weight of the overall composition). In some instances, the sinterable powder comprises 50-100 wt. %, 50-99 wt. %, 50-90 wt. %, 50-80 wt. %, 50-70 wt. %, 60-100 wt. %, 60-99 wt. %, 60-90 wt. %, 70-100 wt. %, 70-99 wt. %, 70-90 wt. %, 80-100 wt. %, 80-99 wt. %, 80-95 wt. %, 85-100 wt. %, 85-99 wt. %, 85-95 wt. %, 90-100 wt. %, or 90-99 wt. % semicrystalline polymer, based on the total weight of the sinterable powder.

In addition to a primary or majority component such as described above, a sinterable powder described herein can also comprise one or more additional components. In some embodiments, for instance, the sinterable powder comprises a filler material. Any filler material not inconsistent with the objectives of the present disclosure may be used. For example, in some cases, the filler material comprises glass, ceramic, or carbon fiber. In some embodiments, the filler material is in the form of spheres, plates, or fibers, and the shape of any filler material is not particularly limited.

A filler material, if used, can be present in the sinterable powder in any amount not inconsistent with the technical objectives of the present disclosure. For example, in some cases, a sinterable powder described herein comprises up to 30 wt. %, up to 20 wt. %, up to 15 wt. %, or up to 10 wt. % filler material, based on the total weight of the sinterable powder (not based on the total weight of the overall composition). In some instances, the sinterable powder comprises 1-30 wt. %, 1-25 wt. %, 1-20 wt. %, 1-15 wt. %, 1-10 wt. %, 1-5 wt. %, 5-30 wt. %, 5-25 wt. %, 5-20 wt. %, 5-15 wt. %, or 5-10 wt. % filler material, based on the total weight of the sinterable powder.

A sinterable powder described herein may also comprise a flowing agent. Any flowing agent not inconsistent with the technical objectives of the present disclosure may be used. For example, in some cases, a flowing agent comprises a nanoparticulate coating or other coating on the sinterable powder or on a semicrystalline polymer of the sinterable powder, such as a silica nanoparticle coating. One example of a flowing agent suitable for use in some embodiments described herein is Aerosil 200.

A flowing agent, if used, can be present in the sinterable powder in any amount not inconsistent with the technical objectives of the present disclosure. For example, in some cases, a sinterable powder described herein comprises up to 10 wt. %, up to 5 wt. %, up to 1 wt. %, or up to 0.5 wt. % flowing agent, based on the total weight of the sinterable powder (not based on the total weight of the overall composition). In some instances, the sinterable powder comprises 0.01-10 wt. %, 0.01-5 wt. %, or 0.01-1 wt. % flowing agent, based on the total weight of the sinterable powder.

Additionally, in some cases, a composition described herein excludes or contains very small amounts of certain components. For instance, in some cases, a composition described herein is free or substantially free of phosphate. A composition described herein that is "substantially free of" phosphate can, in some embodiments, comprise or include less than 5 wt. %, less than 3 wt. %, less than 1 wt. %, or less than 0.5 wt. % phosphate, based on the total weight of the composition. In some cases, a composition that is substantially free of phosphate comprises less than 0.1 wt. % or less than 0.01 wt. % phosphate, based on the total weight of the composition.

In addition to compositions for additive manufacturing, methods of additive manufacturing are also described herein. Such methods of forming or printing a 3D article, object, or part can include forming the 3D article from a plurality of layers of composition described herein, as a build material, including in a layer-by-layer manner. Any composition described hereinabove may be used. Further, the layers of a composition can be formed or provided according to an image of the 3D article in a computer readable format, such as according to preselected computer aided design (CAD) parameters.

As stated previously, such methods can include SLS or other sintering methods. An SLS method, as understood by one of ordinary skill in the art, can comprise retaining a composition described herein in a container (such as a build bed or powder bed) and selectively applying energy to the composition in the container to solidify (or consolidate or sinter) at least a portion of a layer of the composition, thereby forming a solidified (or consolidated or sintered) layer that defines a cross-section of the 3D article. Additionally, a method described herein can further comprise raising or lowering the solidified layer of the composition to provide a new or second layer of unsolidified composition at the surface of the composition in the container, followed by again selectively applying energy to the composition in the container to solidify (or consolidate or sinter) at least a portion of the new or second layer of the composition to form a second solidified layer that defines a second cross-section of the 3D article. Further, the first and second cross-sections of the 3D article can be bonded or adhered to one another in the z-direction (or build direction corresponding to the direction of raising or lowering recited above) by the application of the energy for solidifying (or consolidating or sintering) the composition. Moreover, selectively applying energy to the composition in the container can comprise applying electromagnetic radiation having a sufficient energy to solidify (or consolidate or sinter) the composition. In some instances, the electromagnetic radiation has an average wavelength of 300-1500 nm. In some cases, the solidifying (or consolidating or sintering) radiation is provided by a computer controlled laser beam. In addition, in some cases, raising or lowering a solidified layer of composition is carried out using an elevator platform disposed in the container. A method described herein can also comprise planarizing a new layer of the composition provided by raising or lowering an elevator platform, or rolling out a new layer of the composition. Such planarization or rolling can be carried out, in some cases, by a wiper or roller.

It is further to be understood that the foregoing process can be repeated a desired number of times to provide the 3D article. For example, in some cases, this process can be repeated "n" number of times, wherein n can be up to about 100,000, up to about 50,000, up to about 10,000, up to about 5000, up to about 1000, or up to about 500. Thus, in some embodiments, a method of printing a 3D article described herein can comprise selectively applying energy to a composition in a container to solidify (or consolidate or sinter) at least a portion of an nth layer of the composition, thereby forming an nth solidified layer that defines an nth cross-section of the 3D article, raising or lowering the nth solidified layer of the composition to provide an (n+1)th layer of unsolidified composition at the surface of the composition in the container, selectively applying energy to the (n+1)th layer of the composition in the container to solidify at least a portion of the (n+1)th layer of the composition to form an (n+1)th solidified layer that defines an (n+1)th cross-section of the 3D article, raising or lowering the (n+1)th solidified layer of the composition to provide an (n+2)th layer of unsolidified composition at the surface of the composition in the container, and continuing to repeat the foregoing steps to form the 3D article. Further, it is to be understood that one or more steps of a method described herein, such as a step of selectively applying energy to a layer of composition, can be carried out according to an image of the 3D article in a computer-readable format.

Thus, in some embodiments, a method of printing a 3D article described herein comprises providing a composition described hereinabove and selectively solidifying layers of the composition to form the article. Moreover, in some cases, the composition is provided in a layer-by-layer process. In some cases, the method is an SLS or other particle sintering method of additive manufacturing.

Compositions and methods described herein are not necessarily limited to selective laser sintering (SLS) or other sintering applications or uses. The present disclosure also contemplates compositions and methods of forming articles using other additive manufacturing techniques. For example, in some instances, compositions and methods for fused deposition modeling (FDM) are also described. In such embodiments, the sinterable powder described above can be replaced with a different material, such as a thermoplastic polymer that can be extruded, jetted, or otherwise deposited in a layer-by-layer manner to form a 3D article.

Therefore, in some cases, a composition for additive manufacturing is described herein, wherein the composition comprises a thermoplastic polymer in an amount of 10-99 wt. %, based on the total weight of the composition, and an intumescent additive in an amount of up to 30 wt. %, based on the total weight of the composition. The intumescent additive comprises a phosphinate component and at least one of (a) a heptazine or melamine-derived component, and (b) a proton donor component. In such embodiments, it is to be understood that the intumescent additive and the components thereof (e.g., the phosphinate component, heptazine or melamine-derived component, proton donor component, and blowing agent) can be the same or have the same characteristics as described above for compositions comprising a sinterable powder instead of a thermoplastic polymer. Additionally, the thermoplastic polymer of the composition can comprise any thermoplastic polymer not inconsistent with the technical objectives of the present disclosure. For example, in some cases, the thermoplastic polymer comprises an acrylonitrile butadiene styrene (ABS), a polylactic acid (PLA), a polyethylene terephthalate (PET), a thermoplastic polyurethane (TPU), a nylon, a polycarbonate, or a combination, block copolymer, or melt of two or more of the foregoing.

Such a composition as described above can be used in material deposition methods of additive manufacturing, such as FDM. In a material deposition method, one or more layers of a composition described herein are selectively deposited onto a substrate as a build material and solidified. Solidifying, in some cases, comprises rapid cooling of the composition or the composition's undergoing of a phase transition (e.g., from liquid to solid).

Thus, in some instances, a composition (or build material) described herein is selectively deposited in a fluid state onto a substrate, such as a build pad of a 3D printing system. Selective deposition may include, for example, depositing the build material according to preselected CAD parameters. For example, in some embodiments, a CAD file drawing corresponding to a desired 3D article to be printed is generated and sliced into a sufficient number of horizontal slices. Then, the build material is selectively deposited, layer by layer, according to the horizontal slices of the CAD file drawing to print the desired 3D article. A "sufficient" number of horizontal slices is the number necessary for successful printing of the desired 3D article, e.g., to produce it accurately and precisely.

Further, in some embodiments, a preselected amount of build material described herein is heated to the appropriate temperature and extruded or expelled from a nozzle or print head or a plurality of nozzles or print heads of a suitable printer to form a layer on a print pad in a print chamber. In some cases, each layer of build material is deposited according to preselected CAD parameters. As stated above, in some embodiments, a composition (or build material) described herein exhibits a phase change upon deposition and/or solidifies upon deposition. Moreover, in some cases, the temperature of the printing environment can be controlled so that the deposited portions of build material solidify on contact with the receiving surface. Additionally, in some instances, after each layer is deposited, the deposited material is planarized prior to the deposition of the next layer. Optionally, several layers can be deposited before planarization. Planarization corrects the thickness of one or more layers by evening the dispensed material to remove excess material and create a uniformly smooth exposed or flat up-facing surface on the support platform of the printer. In some embodiments, planarization is accomplished with a wiper device, such as a roller, which may be counter-rotating in one or more printing directions but not counter-rotating in one or more other printing directions. In some cases, the wiper device comprises a roller and a wiper that removes excess material from the roller. Further, in some instances, the wiper device is heated. It should be noted that the consistency of the deposited build material described herein, in some embodiments, should desirably be sufficient to retain its shape and not be subject to excessive viscous drag from the planarizer. Layered deposition of the build material can be repeated until the 3D article has been formed.

Compositions and methods (e.g., SLS or FDM methods) described herein can form 3D articles that exhibit flame or fire resistant or retardant properties. For example, in some cases, the article has a v0 or v1 rating according to UL 94 V. Testing sample thickness achieving a v0 or v1 rating can be less than 2 mm or less than 1 mm, such as 0.8 mm or 0.4 mm, in some embodiments.

Moreover, compositions and methods described herein can be used to provide 3D articles that also have desirable mechanical properties, in addition to exhibiting flame or fire resistant or retardant properties. For instance, 3D articles printed from compositions described herein (and the compositions themselves, upon solidifying as described herein) can have certain mechanical properties such as tensile modulus (TM), tensile strength (TS), and elongation at break (EOB) that are close to those exhibited by otherwise similar 3D articles (or compositions) that do not comprise an intumescent additive as described herein. For example, in some cases, a 3D article or composition described herein can (due to its composition/microstructure) exhibit one, two, or all three of the following metrics:

Tensile Modulus (TM) Ratio of at least 0.9, at least 0.95, or at least 0.98 (e.g., a TM Ratio of 0.9-1 or 0.95 to 1);

Tensile Strength (TS) Ratio of at least 0.6, at least 0.7, at least 0.75, or at least 0.8 (e.g., a TS Ratio of 0.7-1, 0.75-0.85, or 0.8 to 0.95); and Elongation at Break (EOB) Ratio of at least 0.6, at least 0.7, at least 0.75, or at least 0.8 (e.g., an EOB Ratio of 0.7-0.95, 0.7-0.9, 0.7-0.85, 0.8-1, or 0.8-0.9).

The above metrics are based on comparing the identified property (TM, TS, or EOB) of a 3D article formed from a composition described herein to the identified property (TM, TS, or EOB) of an otherwise identical 3D article formed in an otherwise identical manner from a composition that is the same as described herein, except omitting the intumescent additive of the present invention. The relevant property (i.e., tensile modulus, tensile strength or elongation at break) of a test sample (e.g., the 3D article formed from the composition) is measured following printing of the 3D article (e.g., within 12 hours) and at the same time point post-printing for comparison purposes. The same test method (e.g., ASTM D638) is also used for testing both samples/3D articles in a compared set of samples/3D articles. The Ratios above are based on the numerator being the property value (e.g., TM, TS, or EOB) of the 3D article that includes the intumescent additive; the denominator is thus the corresponding property value (e.g., TM, TS, or EOB) of the otherwise similar 3D article that does not include the intumescent additive.

These foregoing embodiments are further illustrated in the following non-limiting examples.

EXAMPLES

Tables 1 and 2 provide formulations of compositions according to some embodiments described herein. The amounts listed in Table 1 are weight percents, based on the total weight of the composition. Dashes (—) indicate a certain component was not used. "Comp." identifies comparative examples.

TABLE 1

| | Compositions | | | | |
|---|---|---|---|---|---|
| | Sinterable Powder | Phosphinate Component | Heptazine or Melamine-Derived Component | Flow Agent | Other Components |
| Example 1 | 79.9 | 17 | 3 | 0.1 | — |
| Example 2 | 79.9 | 17 | 3 | 0.1 | — |
| Example 3 | 79.9 | 17 | 3 | 0.1 | — |
| Example 4 | 85.9 | 10 | 4 | 0.1 | — |
| Example 5 (comp.) | 79.9 | 17 | — | 0.1 | 3 |
| Example 6 (comp.) | 81.9 | 12 | — | 0.1 | 6 |
| Example 7 | 84.9 | 10 | 3 | 0.1 | 2 |

TABLE 2

| | Sinterable Powder | Phosphinate Component | Heptazine or Melamine-Derived Component | Flow Agent | Other Components |
|---|---|---|---|---|---|
| Example 1 | Nylon 11 | Formula II ($R^1$, $R^2$ = C2 alkyl; $M^{n+}$ = $Al^{3+}$) | melam + melem (10:90 ratio) | Aerosil 200 | — |
| Example 2 | Nylon 11 | Formula II ($R^1$, $R^2$ = C2 alkyl; $M^{n+}$ = $Al^{3+}$) | melam + melem (20:80 ratio) | Aerosil 200 | — |
| Example 3 | Nylon 11 | Formula II ($R^1$, $R^2$ = C2 alkyl; $M^{n+}$ = $Al^{3+}$) | melamine + melam + melem (10:10:80 ratio) | Aerosil 200 | — |
| Example 4 | Nylon 11 | Formula II ($R^1$, $R^2$ = C2 alkyl; $M^{n+}$ = $Al^{3+}$) | melam + melem (10:90 ratio) | Aerosil 200 | -- |
| Example 5 (comp.) | Nylon 11 | Formula II ($R^1$, $R^2$ = C2 alkyl; $M^{n+}$ = $Al^{3+}$) | — | Aerosil 200 | melamine polyphosphate |
| Example 6 (comp.) | Nylon 11 | Formula II ($R^1$, $R^2$ = C2 alkyl; $M^{n+}$ = $Al^{3+}$) | — | Aerosil 200 | melamine poly(zinc phosphate) |
| Example 7 | Nylon 11 | Formula II ($R^1$, $R^2$ = C2 alkyl; $M^{n+}$ = $Al^{3+}$) | melam + melem (10:90 ratio) | Aerosil 200 | melamine polyphosphate |

Properties of articles formed of the compositions of Examples 1-7 are provided in Table 3. Flammability testing was conducted in accordance with UL 94V and employed samples of 1.5-3 mm in thickness. Tensile modulus, tensile strength, and elongation at break were measured in accordance with ASTM D638. Heat deflection temperature (HDT) was measured using both 1.82 and 0.455 MPa according to ASTM D648. Dashes (—) indicate the absence of reported data.

TABLE 3

| | Article Properties | | | | |
|---|---|---|---|---|---|
| | Tensile Modulus Ratio | Tensile Strength Ratio | Elongation at Break Ratio | UL 94 V V0 | UL 94 V v1 |
| Example 1 | 1 | 0.62 | 0.60 | Passed (2.5-3 mm) | Passed (1.6 mm) |
| Example 2 | 1 | 0.66 | 0.70 | Passed (2.5-3 mm) | Passed (1.6 mm) |
| Example 3 | 1 | 0.60 | 0.53 | — | Passed (1.6-3 mm) |
| Example 4 | 1 | 0.74 | 0.47 | — | Passed (2.5-3 mm) |
| Example 5 (comp.) | 1 | 0.68 | 0.43 | — | 2.5-3 mm |
| Example 6 (comp.) | 1 | 0.60 | 0.36 | — | — |
| Example 7 | 1 | 0.78 | 0.38 | — | — |

Some additional non-limiting example embodiments are described below.

Embodiment 1. A composition for additive manufacturing comprising:
a sinterable powder in an amount of 10-99 wt. %, based on the total weight of the composition; and
an intumescent additive in an amount of up to 30 wt. %, based on the total weight of the composition,
wherein the intumescent additive comprises a phosphinate component and at least one of (a) a heptazine or melamine-derived component, and (b) a proton donor component that differs from the phosphinate component or heptazine or melamine-derived component.

Embodiment 2. The composition of Embodiment 1, wherein the intumescent additive comprises the heptazine or melamine-derived component.

Embodiment 3. The composition of Embodiment 1, wherein the intumescent additive comprises the proton donor component.

Embodiment 4. The composition of Embodiment 1, wherein the intumescent additive comprises the heptazine or melamine-derived component and the proton donor component.

Embodiment 5. The composition of any of the preceding Embodiments, wherein the phosphinate component comprises a species of Formula I or Formula II:

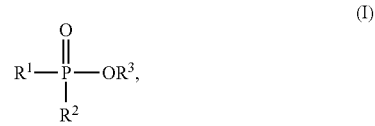

wherein $R^1$, $R^2$, and $R^3$ are each independently selected from the group consisting of hydrogen, alkyl, alkenyl, alkynyl, cycloalkyl, heteroalkyl, heteroalkenyl, heterocyclyl, aryl, and heteroaryl; and

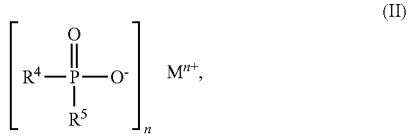

(II)

wherein R⁴ and R⁵ are each independently selected from the group consisting of hydrogen, alkyl, alkenyl, alkynyl, cycloalkyl, heteroalkyl, heteroalkenyl, heterocyclyl, aryl, and heteroaryl;
M is a metal; and
n is an integer ranging from 1 to 3.

Embodiment 6. The composition of any of the preceding Embodiments, wherein the heptazine or melamine-derived component comprises a species of Formula III:

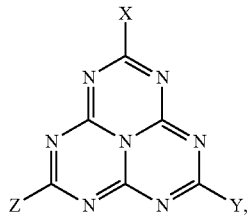

(III)

wherein X, Y, and Z are each independently selected from H and NR⁶R⁷;
wherein R⁶ and R⁷ are each independently selected from H and a C1-C5 alkyl.

Embodiment 7. The composition of any of the preceding Embodiments, wherein the heptazine or melamine-derived component comprises a species of Formula IV:

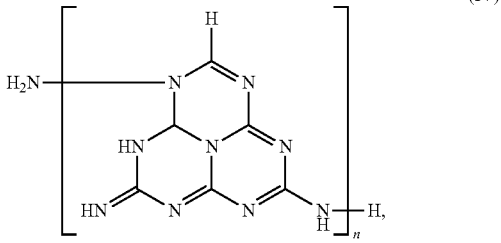

(IV)

wherein n is an integer from 2 to 1000.

Embodiment 8. The composition of any of the preceding Embodiments, wherein the heptazine or melamine-derived component comprises a species of Formula V:

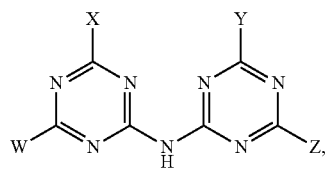

(V)

wherein W, X, Y, and Z are each independently selected from H and NR⁶R⁷;
wherein R⁶ and R⁷ are each independently selected from H and a C1-C5 alkyl.

Embodiment 9. The composition of any of the preceding Embodiments, wherein the heptazine or melamine-derived component comprises a heptazine or melamine-derived oligomer.

Embodiment 10. The composition of any of the preceding Embodiments, wherein the heptazine or melamine-derived component comprises $g-C_3N_4$.

Embodiment 11. The composition of any of the preceding Embodiments, wherein the heptazine or melamine-derived component does not comprise melamine.

Embodiment 12. The composition of any of the preceding Embodiments, wherein the proton donor component comprises an organophosphorus compound other than a phosphinate.

Embodiment 13. The composition of Embodiment 12, wherein the proton donor component comprises a phosphonate.

Embodiment 14. The composition of Embodiment 12, wherein the proton donor component comprises a species of Formula VII or Formula VIII:

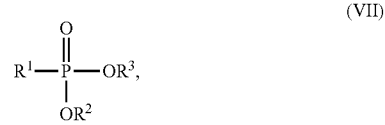

(VII)

wherein R¹, R², and R³ are each independently selected from the group consisting of hydrogen, alkyl, alkenyl, alkynyl, cycloalkyl, heteroalkyl, heteroalkenyl, heterocyclyl, aryl, and heteroaryl; and

(VIII)

wherein R⁴ and R⁵ are each independently selected from the group consisting of hydrogen, alkyl, alkenyl, alkynyl, cycloalkyl, heteroalkyl, heteroalkenyl, heterocyclyl, aryl, and heteroaryl;
M is a metal; and
n is an integer ranging from 1 to 3.

Embodiment 15. The composition of any of the preceding Embodiments, wherein the intumescent additive is present in the composition in an amount of 10-30 wt. %, based on the total weight of the composition.

Embodiment 16. The composition of any of the preceding Embodiments, wherein the intumescent additive is present in the composition in an amount of 14-24 wt. %, based on the total weight of the composition.

Embodiment 17. The composition of any of the preceding Embodiments, wherein the composition is free or substantially free of phosphate.

Embodiment 18. The composition of any of the preceding Embodiments, wherein the sinterable powder comprises a semicrystalline polymer.

Embodiment 19. The composition of any of the preceding Embodiments, wherein the sinterable powder comprises a polyamide (PA), a polyester (PEs), a polyurethane (PU), a polyethyelene (PE), a polypropylene (PP), a poly(butylene terephthalate) (PBT), a poly(etheretherketone) (PEEK), a poly(etherketoneketone) (PEKK), or a combination of two or more of the foregoing.

Embodiment 20. The composition of any of the preceding Embodiments, wherein the sinterable powder comprises a polyamide.

Embodiment 21. The composition of any of the preceding Embodiments, wherein the sinterable powder comprises a filler material.

Embodiment 22. A method of printing a three-dimensional article comprising:
  providing a composition according to any of Embodiments 1-21; and
  selectively solidifying layers of the composition to form the article.

Embodiment 23. The method of Embodiment 22, wherein the composition is provided in a layer-by-layer process.

Embodiment 24. The method of Embodiment 22 or 23, wherein the article has a v0 or v1 rating according to UL 94 V.

Embodiment 25. The method of Embodiment 22 or 23, wherein the article has one, two, or three of the following:
  a Tensile Modulus (TM) Ratio of at least 0.9;
  a Tensile Strength (TS) Ratio of at least 0.7; and
  an Elongation at Break (EOB) Ratio of at least 0.7.

Embodiment 26. The method of Embodiment 22 or 23, wherein:
  the article has a v0 or v1 rating according to UL 94 V; and
  the article has one, two, or three of the following:
  a Tensile Modulus (TM) Ratio of at least 0.9;
  a Tensile Strength (TS) Ratio of at least 0.7; and
  an Elongation at Break (EOB) Ratio of at least 0.7.

Embodiment 27. A composition for additive manufacturing comprising:
  a thermoplastic polymer in an amount of 10-99 wt. %, based on the total weight of the composition; and
  an intumescent additive in an amount of up to 30 wt. %, based on the total weight of the composition,
  wherein the intumescent additive comprises a phosphinate component and at least one of (a) a heptazine or melamine-derived component, and (b) a proton donor component that differs from the phosphinate component or heptazine or melamine-derived component.

Embodiment 28. The composition of Embodiment 27, wherein the intumescent additive comprises the heptazine or melamine-derived component.

Embodiment 29. The composition of Embodiment 27, wherein the intumescent additive comprises the proton donor component.

Embodiment 30. The composition of Embodiment 27, wherein the intumescent additive comprises the heptazine or melamine-derived component and the proton donor component.

Embodiment 31. The composition of any of Embodiments 27-30, wherein the phosphinate component comprises a species of Formula I or Formula II:

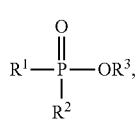
(I)

wherein $R^1$, $R^2$, and $R^3$ are each independently selected from the group consisting of hydrogen, alkyl, alkenyl, alkynyl, cycloalkyl, heteroalkyl, heteroalkenyl, heterocyclyl, aryl, and heteroaryl; and

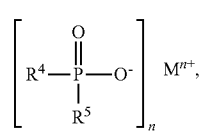
(II)

wherein $R^4$ and $R^5$ are each independently selected from the group consisting of hydrogen, alkyl, alkenyl, alkynyl, cycloalkyl, heteroalkyl, heteroalkenyl, heterocyclyl, aryl, and heteroaryl;
M is a metal; and
n is an integer ranging from 1 to 3.

Embodiment 32. The composition of any of Embodiments 27-31, wherein the heptazine or melamine-derived component comprises a species of Formula III:

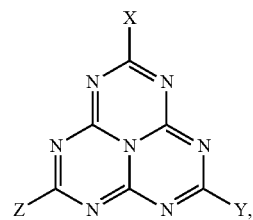
(III)

wherein X, Y, and Z are each independently selected from H and $NR^6R^7$;
wherein $R^6$ and $R^7$ are each independently selected from H and a C1-C5 alkyl.

Embodiment 33. The composition of any of Embodiments 27-32, wherein the heptazine or melamine-derived component comprises a species of Formula IV:

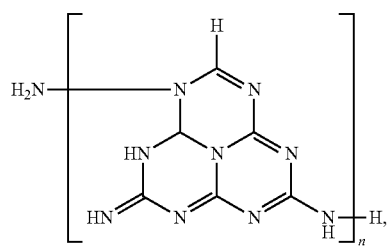
(IV)

wherein n is an integer from 2 to 1000.

Embodiment 34. The composition of any of Embodiments 27-33, wherein the heptazine or melamine-derived component comprises a species of Formula V:

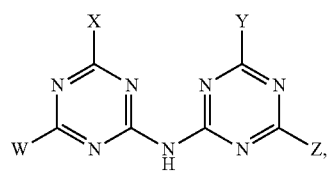
(V)

wherein W, X, Y, and Z are each independently selected from H and $NR^6R^7$;

wherein $R^6$ and $R^7$ are each independently selected from H and a C1-C5 alkyl.

Embodiment 35. The composition of any of Embodiments 27-34, wherein the heptazine or melamine-derived component comprises a heptazine or melamine-derived oligomer.

Embodiment 36. The composition of any of Embodiments 27-35, wherein the heptazine or melamine-derived component does not comprise melamine.

Embodiment 37. The composition of any of Embodiments 27-36, wherein the proton donor component comprises an organophosphorus compound other than a phosphinate.

Embodiment 38. The composition of Embodiment 37, wherein the proton donor component comprises a phosphonate.

Embodiment 39. The composition of Embodiment 37, wherein the proton donor component comprises a species of Formula VII or Formula VIII:

wherein $R^1$, $R^2$, and $R^3$ are each independently selected from the group consisting of hydrogen, alkyl, alkenyl, alkynyl, cycloalkyl, heteroalkyl, heteroalkenyl, heterocyclyl, aryl, and heteroaryl; and

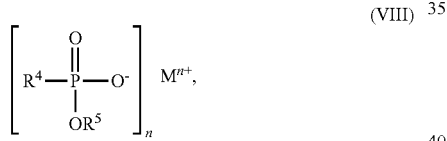

wherein $R^4$ and $R^5$ are each independently selected from the group consisting of hydrogen, alkyl, alkenyl, alkynyl, cycloalkyl, heteroalkyl, heteroalkenyl, heterocyclyl, aryl, and heteroaryl;

M is a metal; and n is an integer ranging from 1 to 3.

Embodiment 40. The composition of any of Embodiments 27-39, wherein the intumescent additive is present in the composition in an amount of 10-30 wt. %, based on the total weight of the composition.

Embodiment 41. The composition of any of Embodiments 27-40, wherein the intumescent additive is present in the composition in an amount of 14-24 wt. %, based on the total weight of the composition.

Embodiment 42. The composition of any of Embodiments 27-41, wherein the composition is free or substantially free of phosphate.

Embodiment 43. The composition of any of Embodiments 27-42, wherein the thermoplastic polymer comprises an acrylonitrile butadiene styrene (ABS), a polylactic acid (PLA), a polyethylene terephthalate (PET), a thermoplastic polyurethane (TPU), a nylon, a polycarbonate, or a combination, block copolymer, or melt of two or more of the foregoing.

Embodiment 44. A method of printing a three-dimensional article comprising:

providing a composition according to any of Embodiments 27-43; and selectively solidifying layers of the composition to form the article.

Embodiment 45. The method of Embodiment 44, wherein the composition is provided in a layer-by-layer process.

Embodiment 46. The method of Embodiment 44 or 45, wherein the article has a v0 or v1 rating according to UL 94 V.

Embodiment 47. The method of Embodiment 44 or 45, wherein the article has one, two, or three of the following:

a Tensile Modulus (TM) Ratio of at least 0.9;

a Tensile Strength (TS) Ratio of at least 0.7; and an Elongation at Break (EOB) Ratio of at least 0.7.

Embodiment 48. The method of Embodiment 44 or 45, wherein: the article has a v0 or v1 rating according to UL 94 V; and the article has one, two, or three of the following:

a Tensile Modulus (TM) Ratio of at least 0.9;

a Tensile Strength (TS) Ratio of at least 0.7; and an Elongation at Break (EOB) Ratio of at least 0.7.

All patent documents referred to herein are incorporated by reference in their entireties. Various embodiments of the invention have been described in fulfillment of the various objectives of the invention. It should be recognized that these embodiments are merely illustrative of the principles of the present invention. Numerous modifications and adaptations thereof will be readily apparent to those skilled in the art without departing from the spirit and scope of the invention.

The invention claimed is:

1. A composition for additive manufacturing comprising:
    a sinterable powder in an amount of 10-99 wt. %, based on the total weight of the composition; and
    an intumescent additive in an amount of up to 30 wt. %, based on the total weight of the composition,
wherein the intumescent additive comprises a phosphinate component and at least one of (a) a heptazine or melamine-derived component, and (b) a proton donor component that differs from the phosphinate component or heptazine or melamine-derived component, and
    wherein the heptazine or melamine-derived component comprises $g-C_3N_4$.

2. The composition of claim 1, wherein the intumescent additive comprises the heptazine or melamine-derived component.

3. The composition of claim 1, wherein the intumescent additive comprises the proton donor component.

4. The composition of claim 1, wherein the intumescent additive comprises the heptazine or melamine-derived component and the proton donor component.

5. The composition of claim 1, wherein the phosphinate component comprises a species of Formula I or Formula II:

wherein $R^1$, $R^2$, and $R^3$ are each independently selected from the group consisting of hydrogen, alkyl, alkenyl, alkynyl, cycloalkyl, heteroalkyl, heteroalkenyl, heterocyclyl, aryl, and heteroaryl; and $$\left[ \begin{array}{c} \text{O} \\ \| \\ R^4-P-O^- \\ | \\ R^5 \end{array} \right]_n M^{n+},\quad\text{(II)}$$

wherein R⁴ and R⁵ are each independently selected from the group consisting of hydrogen, alkyl, alkenyl, alkynyl, cycloalkyl, heteroalkyl, heteroalkenyl, heterocyclyl, aryl, and heteroaryl;

M is a metal; and n is an integer ranging from 1 to 3.

6. The composition of claim 1, wherein the heptazine or melamine-derived component comprises a species of Formula III:

(III) [heptazine structure with substituents X, Y, Z]

wherein X, Y, and Z are each independently selected from H and NR⁶R⁷;

wherein R⁶ and R⁷ are each independently selected from H and a C1-C5 alkyl.

7. The composition of claim 1, wherein the heptazine or melamine-derived component comprises a species of Formula IV:

(IV) [heptazine-based oligomer structure with H₂N- terminus and n repeat units]

wherein n is an integer from 2 to 1000.

8. The composition of claim 1, wherein the heptazine or melamine-derived component comprises a species of Formula V:

(V) [bis-triazine structure with substituents X, Y, W, Z linked via NH]

wherein W, X, Y, and Z are each independently selected from H and NR⁶R⁷;

wherein R⁶ and R⁷ are each independently selected from H and a C1-C5 alkyl.

9. The composition of claim 1, wherein the heptazine or melamine-derived component comprises a heptazine or melamine-derived oligomer.

10. The composition of claim 1, wherein the heptazine or melamine-derived component does not comprise melamine.

11. The composition of claim 1, wherein the proton donor component comprises an organophosphorus compound other than a phosphinate.

12. The composition of claim 11, wherein the proton donor component comprises a phosphonate.

13. The composition of claim 11, wherein the proton donor component comprises a species of Formula VII or Formula VIII:

$$R^1-\underset{\underset{OR^2}{|}}{\overset{\overset{O}{\|}}{P}}-OR^3,\quad\text{(VII)}$$

wherein R¹, R², and R³ are each independently selected from the group consisting of hydrogen, alkyl, alkenyl, alkynyl, cycloalkyl, heteroalkyl, heteroalkenyl, heterocyclyl, aryl, and heteroaryl; and $$\left[ \begin{array}{c} \text{O} \\ \| \\ R^4-P-O^- \\ | \\ OR^5 \end{array} \right]_n M^{n+},\quad\text{(VIII)}$$

wherein R⁴ and R⁵ are each independently selected from the group consisting of hydrogen, alkyl, alkenyl, alkynyl, cycloalkyl, heteroalkyl, heteroalkenyl, heterocyclyl, aryl, and heteroaryl;

M is a metal; and n is an integer ranging from 1 to 3.

14. The composition of claim 1, wherein the intumescent additive is present in the composition in an amount of 14-24 wt. %, based on the total weight of the composition.

15. The composition of claim 1, wherein the composition is free or substantially free of phosphate.

16. The composition of claim 1, wherein the sinterable powder comprises a semicrystalline polymer.

17. The composition of claim 1, wherein the sinterable powder comprises a polyamide (PA), a polyester (PEs), a polyurethane (PU), a polyethyelene (PE), a polypropylene (PP), a poly(butylene terephthalate) (PBT), a poly(etheretherketone) (PEEK), a poly(etherketoneketone) (PEKK), or a combination of two or more of the foregoing.

18. A method of printing a three-dimensional article comprising:
    providing a composition according to claim 1; and
    selectively solidifying layers of the composition to form the article.

19. The method of claim 18, wherein the composition is provided in a layer-by-layer process.

* * * * *